March 31, 1970  SOSABURO MAESHIBA  3,503,637
PIPE COUPLING WITH SPRING BIASED DETENTS Filed June 15, 1967  2 Sheets-Sheet 1

INVENTOR.
SOSABURO MAESHIBA,
BY
Linton and Linton
ATTORNEYS.

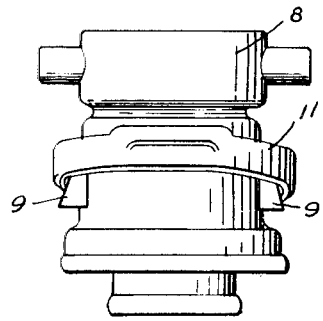
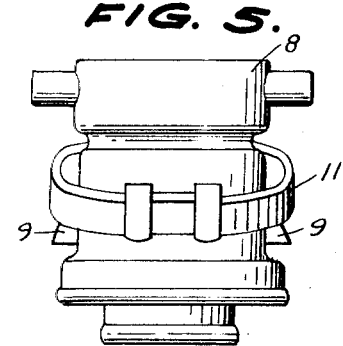
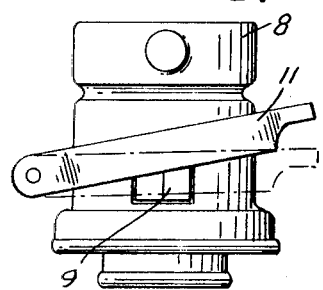
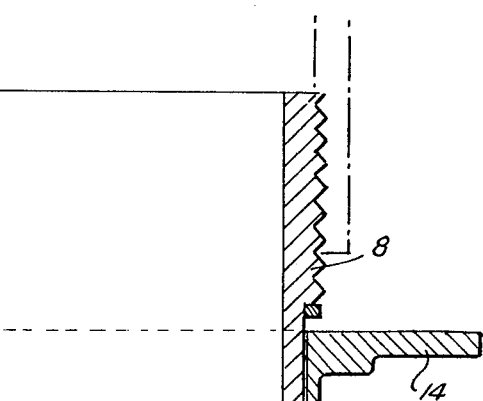

United States Patent Office 3,503,637
Patented Mar. 31, 1970

3,503,637
PIPE COUPLING WITH SPRING BIASED DETENTS
Sosaburo Maeshiba, 118–1 Aza-Toryo, Oaza-Sumiyoshi, Fukuoka, Fukuoka Prefecture, Japan
Filed June 15, 1967, Ser. No. 646,350
Int. Cl. F16l 37/18
U.S. Cl. 285—315          1 Claim

ABSTRACT OF THE DISCLOSURE

A pipe coupling comprising two pipe members, one located within the other with an annular packing axially compressed therebetween. Spring biased detent means are provided to hold the pipes in coupled relationship and pivoting means are provided to urge the detents into a releasing position.

DESCRIPTION

The present invention relates to a method of coupling two pipes, particularly to a method of coupling the pipes for liquid fuel supply.

In the supply operation of a liquid fuel like gasoline, the connection of oil feed hose from the underground tank to the hose of a tank car must be perfectly airtight. In the conventional method of coupling two pipes, a thick packing was provided between two pipes, but owing to the low compression ratio of the packing there was a hazard, in time of oil supply, of the oil and gas leaking, catching fire and resulting in an explosion.

The present invention provides a new method of coupling two pipes without any possibility of the liquid fuel leaking at the coupling in the following fashion: An annular packing made of an elastic material like rubber is provided in one of the two pipes so that it can cooperate with a spiral spring; said packing is located at the end of the one pipe, forming a passage; the tip of the other pipe is inserted into said passage of said packing; and thereby the two pipes are fixed.

Further, the invention provides a method of fixing two pipes by engaging means which utilizes the elasticity of an annular packing made of an elastic material like rubber and equipped with a spiral spring and which has a tendency to elastically expand in radial direction.

Figure 1:
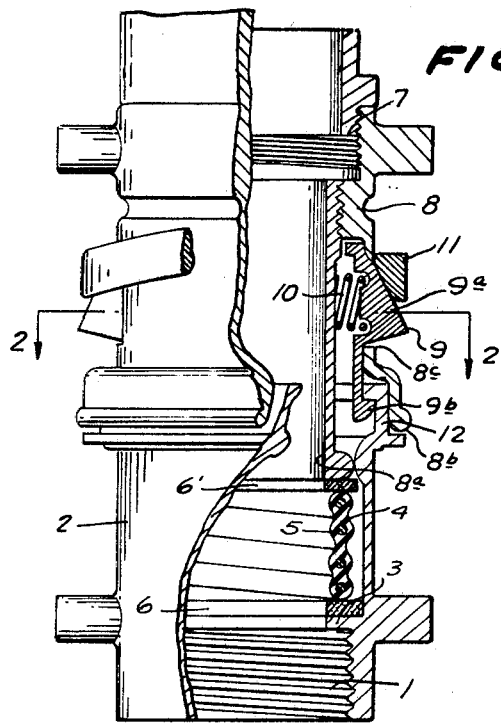
Figure 2:
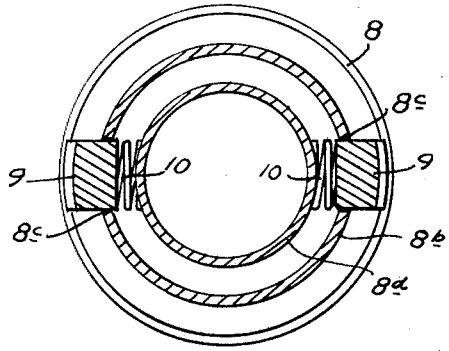
Figure 3:
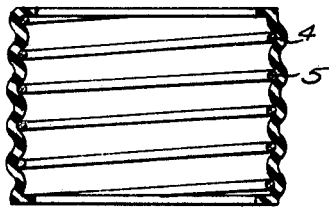
Figure 7:
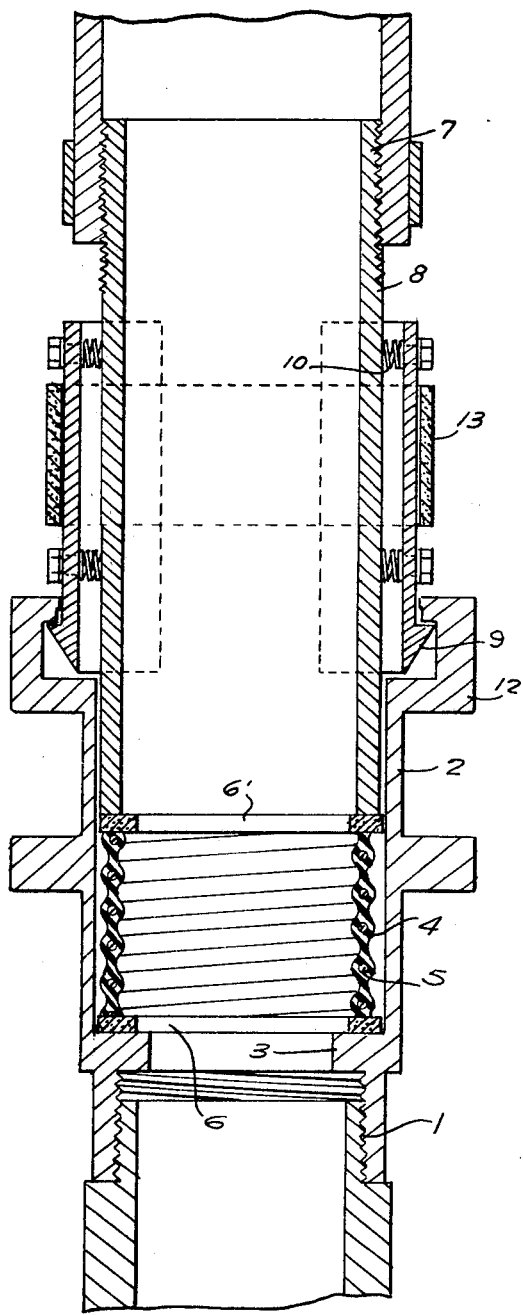

The details of the invention will be described with reference to the attached drawings, in which:

FIGURE 1 shows a partial longitudinal section of the elevation of an embodiment of the invention;
FIGURE 2 shows a cross-section at II—II of FIG. 1;
FIGURE 3 shows another embodiment of the packing;
FIGURE 4 shows an elevation of a tubular member;
FIGURE 5 shows a backside view of the tubular member of FIG. 4;
FIGURE 6 shows a liftside view of the tubular member of FIG. 4; and
FIGURES 7 and 8 show longitudinal sections of a second and a third embodiments of the invention.

In the embodiment illustrated in FIGS. 1 and 2, the reference numeral 2 indicates a tubular member to be fixed at the tip of one pipe. This tubular 2 is formed roughly tubular. At its lower end there is a fixer 1 which fixed at the tip of one pipe. This tubular member 2 is formed roughly tubular. At its lower end there is a fixer 1 which fixes the tip of pipe. Above said fixer 1 there is formed a flange 3 which projects on the inside surface at midpoint of said tubular member 2. Above this flange 3 in the tubular member 2, there is located with an elastic ring 6 in between an annular packing 4 which is made of an oil-resistant elastic material and has a spiral spring 5 embedded therein. Said elastic ring 6 is desirably to be bonded to said annular packing 4. To the upper end of the annular packing 4 is bonded an elastic ring 6'. At the tip of the tubular member 2 there are formed two opposite engaging means 12 which are bent inward.

The tubular member fixed to the tip of one pipe thus composed is usually covered with an adequate cap which closes the passage of pipe.

The numeral 8 indicates a second tubular member fitted at the tip of the other pipe. Said tubular member 8 is at its top equipped with a fixer 7 to fix the tip of pipe. Said tubular member 8 has a downward-extended insertion tube 8a, which has a smaller bore so as to be able to go into the passage of said metal 2. The bore is desirably to be nearly the same as the diameter of said annular packing 4. Said coupling metal 8 also contains a skirt 8b which has a slightly clearance to said insertion tube 8a. Said skirt 8b has grooves 8c cut at two corresponding positions. The guide 9a of said engaging means 9 fit into said grooves 8c; and the spring 10 located between the insertion tube 8a and the engaging means 9 presses the engaging means 9 into the grooves 8c. The lower end of the engaging means 9 is formed like a hook 9b. As shown in FIGS. 4 to 6, a press operator 11 is pivoted to the tubular member 8 in contact with the guide 9a.

By inserting the tube 8a of the tubular member 8 into the annular packing 4 in the passage of the tubular member 2 and further pushing the tubular member 8 inward, the annular packing 4 will be compressed and the hook 9b of the engaging means will fit the opposite engaging means 12 of the tubular member 8. This engagement is always strong on account of the elasticity of the annular packing. For the purpose of disengagement, the press operator 11 has only to be pushed downward. Then the engaging means 9 will go back overcoming the spring 10; thereby the tubular member 2, 8 will be pulled apart by the elasticity of the annular packing.

In the annular packing according to the invention, a high compression ratio is gained by the action of a spiral spring; air tightness is good; and even if the packing is moved heavily, water- and air-tightness are not affected. In the construction of the annular packing, the spiral spring may, as illustrated in FIG. 3, be located inside of the elastic material or, may, though not shown, be located outside of it.

In the embodiment of FIG. 7 (same numerals denote the same parts in the preceding embodiment) the tubular member 8, with a flexible band 13 encircling the tubular member 8 and the engaging means 9; said flexible band 13 corresponds to the press operator 11 in the preceding embodiment.

In the embodiment of FIG. 8, the tubular member 8 is further simplified. In this case, both the engaging means 9 and the spring 10 are built within the tubular member 2, while the opposite engaging means 12 to fit the engaging means 9 is provided on the periphery of the tubular member 8. The engaging means 9 has a tendency to turn inward under the action of the spring 10 and its surface facing the tubular member 8 is inclined downward. The lower end 14a of the press operator 14 slidably fitted on the tubular member 8 comes on the inclined surface of the engaging means 9 on account of the engagement of the tubular members 2 and 8. Therefore, when the press operator 14 is forcibly lowered, the engaging means 9 is pulled outward against the action of the spring 10, thereby disengaging the engaging means 9 from the opposite engaging means 12; and the elasticity of the annular packing 4 separates the two coupling metals.

What is claimed is:

1. A pipe coupling comprising a tubular member attachable to a pipe, said tubular member having a shoulder in the bore thereof and wall means defining a groove opening into said bore adjacent an end portion thereof, a resilient tubular packing mounted on said shoulder within said tubular member bore, a second tubular member attachable to a second pipe, said second tubular member having an end portion formed by two concentric tubes radially spaced from each other at the end portion of said second tubular member and secured to each other remote from the end portion of said second tubular member, the radially inner concentric tube having an end portion insertable in said first tubular member bore against said packing, at least one resilient engaging means capable of detachably retaining said radially inner concentric tube end portion in the bore of said first tubular member compressing said packing, a guide positioned in the space between said concentric tubes and having a hook shaped end for engaging a wall of said groove, the radially outer concentric tube having a slot therein, a spring tending to move said guide through said slot and said hook end into said first tubular member groove, and a press operator encircling the periphery of said second tubular member and said resilient engaging means and pivotally connected to said second tubular member for engaging and moving said guide against said spring for disengaging said hook from said first tubular member groove whereby said two tubular members can be detached when desired.

References Cited

UNITED STATES PATENTS

| | | | |
|---|---|---|---|
| 198,402 | 12/1877 | Marsden | 285—317 |
| 736,908 | 8/1903 | Wright | 285—319 X |
| 737,357 | 8/1903 | Crump et al. | 285—319 X |
| 921,691 | 5/1909 | Friday | 285—319 X |
| 1,253,309 | 1/1918 | Ulleland | 285—8 |
| 2,385,156 | 9/1945 | Newell | 277—235 X |
| 2,479,960 | 8/1949 | Osborn | 285—308 X |
| 2,688,499 | 9/1954 | Hanson | 285—8 |
| 3,252,707 | 5/1966 | Mirsky | 277—235 X |
| 1,916,284 | 7/1933 | Ragan | 285—314 X |

FOREIGN PATENTS

| | | |
|---|---|---|
| 508,735 | 7/1939 | Great Britain. |

DAVID J. WILLIAMOWSKY, Primary Examiner

DAVE W. AROLA, Assistant Examiner

U.S. Cl. X.R.

285—317, 375